Oct. 22, 1946.     C. BRODALE     2,409,831
AUTOMATIC HITCH
Filed Aug. 3, 1944     3 Sheets-Sheet 1
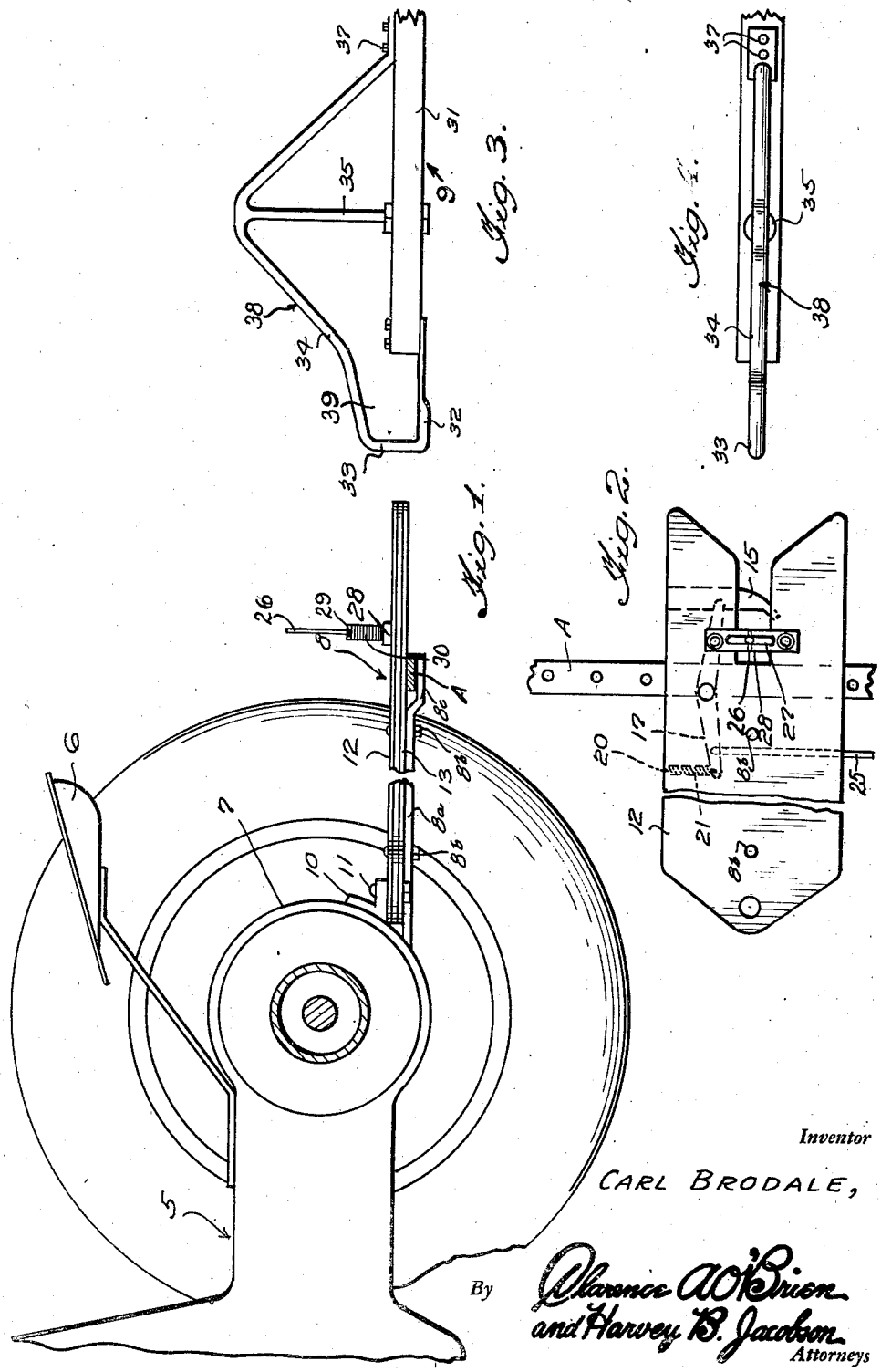
Inventor
CARL BRODALE,

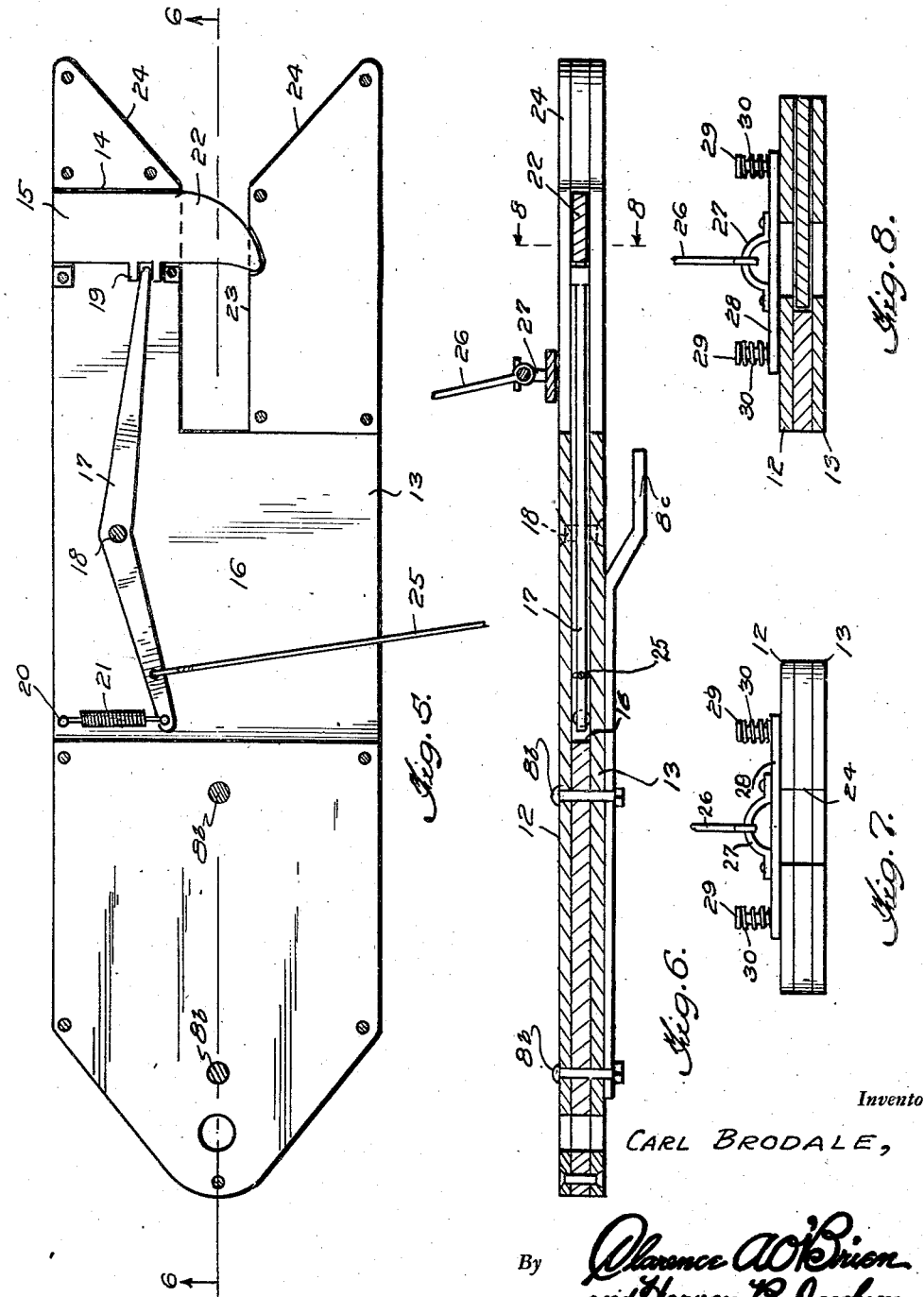

Oct. 22, 1946.  C. BRODALE  2,409,831
AUTOMATIC HITCH
Filed Aug. 3, 1944  3 Sheets-Sheet 3
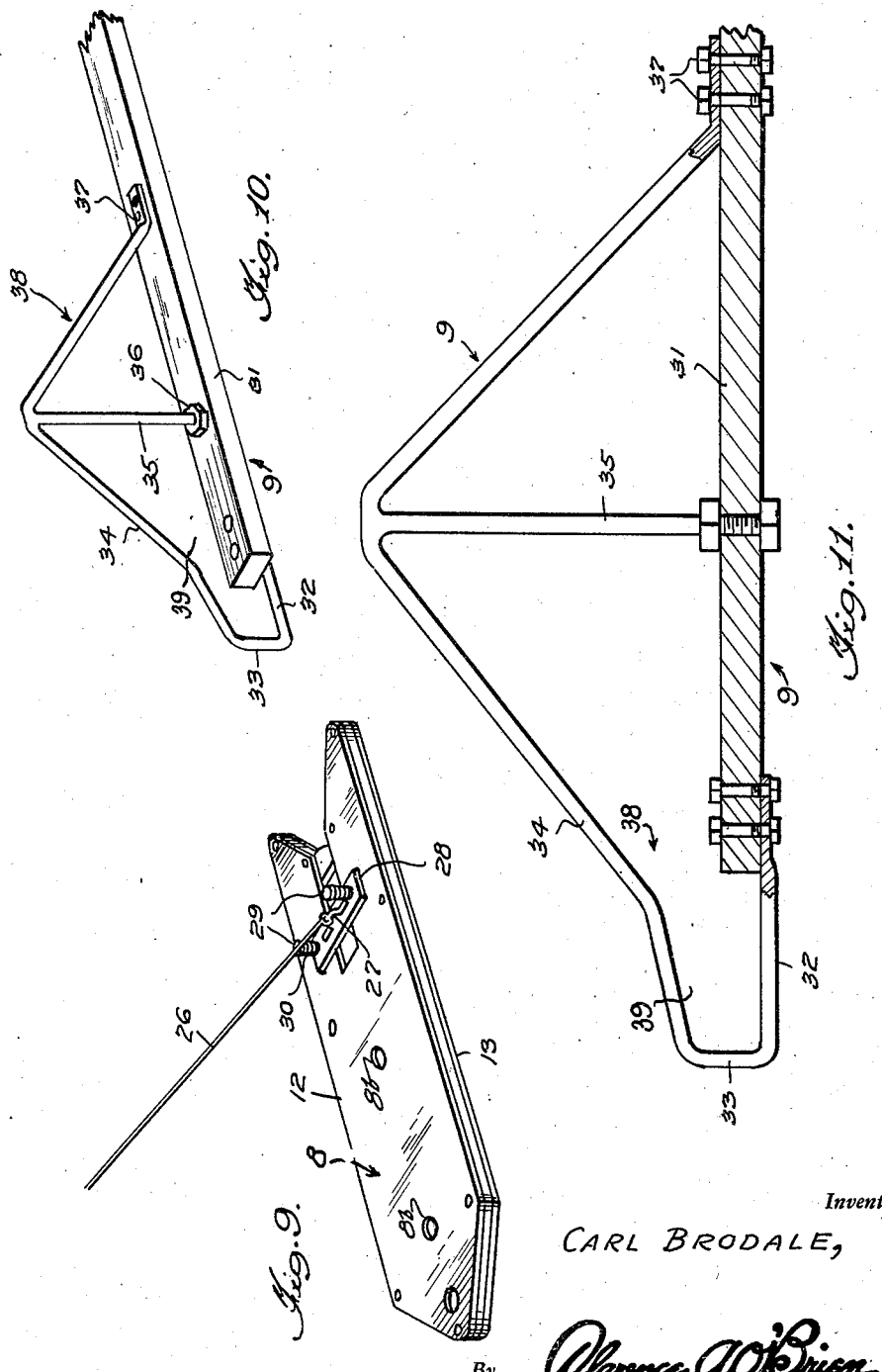
Inventor
CARL BRODALE,
By Clarence A. O'Brien
and Harvey B. Jacobson
Attorneys Patented Oct. 22, 1946

2,409,831

UNITED STATES PATENT OFFICE 2,409,831

AUTOMATIC HITCH

Carl Brodale, Humboldt, Iowa

Application August 3, 1944, Serial No. 547,832

1 Claim. (Cl. 280—33.15)

This invention appertains to new and useful improvements in hitches such as are employed between tractors and various farm equipment.

The principal object of the present invention is to provide a hitch whereby a tractor can be coupled to a farm implement or vehicle in a quick and convenient manner, simply by backing the tractor to the equipment or vehicle.

Another important object of the invention is to provide a hitch which can be easily unfastened when it is desired to disconnect a tractor from a vehicle or farm equipment.

Other important objects and advantages of the invention will become apparent to the reader of the following description.

In the drawings:

Figure 1 is a fragmentary vertical sectional view through a conventional tractor showing the tractor portion of the hitch installed.

Figure 2 is a fragmentary top plan view of the tractor portion of the hitch.

Figure 3 is a side elevational view of the draft machine portion of the hitch.

Figure 4 is a fragmentary top plan view of the structure shown in Figure 3.

Figure 5 is an enlarged horizontal sectional view through the drawbar structure.

Figure 6 is a longitudinal sectional view through the entire tongue structure taken substantially on the line 6—6 of Figure 5.

Figure 7 is a rear end elevational view of the drawbar.

Figure 8 is a cross sectional view taken substantially on the line 8—8 of Figure 6.

Figure 9 is a perspective view of the drawbar.

Figure 10 is a perspective view of the tongue.

Figure 11 is an enlarged fragmentary side elevational and sectional view of the tongue.

Referring to the drawings wherein like numerals designate like parts, it can be seen in Figure 1, that numeral 5 generally refers to a conventional tractor having the usual driver's seat 6 and the rear axle and differential housing 7.

Numeral 8 generally refers to an improved tractor attached drawbar, while numeral 9 generally refers to an improved draft machine or vehicle attached tongue.

The drawbar 8 is pivotally connected to the tractor 5 by a bracket 10 and a pivot pin 11 and is made up of an upper elongated plate 12 and a correspondingly shaped elongated plate 13. Suitable spacing means is provided between these plates so as to define a slideway 14 for a slidable latch member 15 and a pocket 16 in which a rocker 17 is operative and fulcrumed as at 18. One end of this rocker 17 engages into a bifurcated lug 19 on the latch member 15, while between an anchor point 20 and the other end of the rocker 17, a coiled tension spring is provided, this spring serving to hold the rocker 17 in a position maintaining the latch member 15 with its tapered end portion 22 bridging a space 23. This end of the drawbar is bifurcated to define the space 23 and the inner side portions of the furcations of this end of the drawbar are beveled as at 24 to facilitate receiving the tongue 9 (see Figure 3).

A pull line 25 extends through the pocket 16 off to one side of the drawbar 8 and by pulling on this line 25, the latch member 15 can be operated.

The drawbar 8 rests on the usual tractor draftbar A. A brace-bar 8a bolted, as at 8b, to the underside of said drawbar 8 with a downwardly offset end 8c underlying the draft-bar A serves to hold the draw-bar 8 down on said draft-bar A.

When it is desired to release a combine or heavy machine, it is only necessary to pull on a cable 26, which is connected to an aye 27 on a cross plate 28, this plate bridging the space 23 and having a pair of upstanding and headed pins 29 extending therethrough from the drawbar 8. Coiled compression springs 30 are provided on the pins 29 and interposed between the heads thereof and the plate 28.

The tongue 9 consists of a tongue bar 31 attached in a suitable manner to a farm machine or vehicle and this has suitably fixed thereto a rod frame 38 extending outwardly as at 32 and upwardly as at 33, and from there the rod frame 38 inclines at as 34 upwardly to the top of a post 35 which is suitably secured as at 36 to the tongue bar 31. This rod continues on down and is secured as at 37 to the tongue bar. The rod frame 38 and tongue bar 31, forwardly of the post 35, form a closed loop 39 for entering the space 23 and through which the latch member 15 is adapted to extend to hitch the tongue 9 to the draw bar 8.

Normally, the cross plate 28, being in front of the latch member 15, prevents the loop 39 from moving too far forwardly in the space 23. By pulling up on the cable 26, the cross plate 28 may be lifted and the draw bar 8 backed to locate said plate 28 over the forward portion of the loop 39 so that when said draw bar 8 is backed further, said plate 28 will engage the incline 34 of the rod frame 38 and cam said loop 39 downwardly to uncouple the tongue 9 from the draw bar 8, when the latch member 15 is operated to unlatching position.

While the foregoing specification sets forth the invention in specific terms, it is to be understood that numerous changes in the shape, size and materials may be resorted to without departing from the spirit and scope of the invention as claimed hereinafter.

Having described the invention, what is claimed as new is:

A hitch comprising a tractor attached drawbar and a draft vehicle attached tongue, said tongue having an upstanding frame thereon adapted to be engaged by the drawbar, said drawbar consisting of a bifurcated member adapted to receive the frame of the tongue, and an elongated latch member endwise slidable in said drawbar across the bifurcated portion of the drawbar to prevent displacement of the frame, said drawbar consisting of upper and lower plates between which the latch member is slidable, a rocker mounted between the plates, a pull line for the rocker, one end of the rocker being engageable with the latch member for sliding the said latch member with respect to the bifurcated portion of the drawbar.

CARL BRODALE.